May 13, 1924.  1,494,164

A. T. GOLDBECK
DEVICE FOR AUTOMATICALLY COUNTING AND WEIGHING VEHICLES
OPERATING ON THE HIGHWAY
Filed Aug. 30, 1923

Albert T. Goldbeck
Inventor

Attorney

Patented May 13, 1924.

1,494,164

UNITED STATES PATENT OFFICE.

ALBERT T. GOLDBECK, OF WASHINGTON, DISTRICT OF COLUMBIA, DEDICATED, BY MESNE ASSIGNMENTS, TO THE CITIZENS OF THE UNITED STATES OF AMERICA.

DEVICE FOR AUTOMATICALLY COUNTING AND WEIGHING VEHICLES OPERATING ON THE HIGHWAY.

Application filed August 30, 1923. Serial No. 660,241.

(FILED UNDER THE ACT OF MARCH 3, 1883, 22 STAT. L., 625.)

*To all whom it may concern:*

Be it known that I, ALBERT T. GOLDBECK, a citizen of the United States of America, and an employee of the United States Department of Agriculture, residing in the city of Washington, District of Columbia (whose post-office address is Department of Agriculture, Washington, D. C.), have invented a certain new and useful Device for Automatically Counting and Weighing Vehicles Operating on the Highway.

This application is made under the act of March 3, 1883, chapter 143 (22 Stat. 625) and the invention herein described and claimed may be used by the Government of the United States or any of its officers or employees in the prosecution of work for the Government, or by any citizen of the United States, without payment to me of any royalty thereon.

In the past it has been found necessary to make a traffic count on various highways at stated intervals of time for the purpose of classifying traffic in accordance with the weights of the motor vehicles. Such information is useful in giving highway authorities knowledge with respect to a number of matters connected with highways. Thus a traffic count combined with maintenance figures gives the cost of the maintenance of the road per ton mile of traffic. Again, a knowledge of the number and weight of vehicles using a given road is of value in planning future extensions of that road or in the selection of the type of road to take care of this amount of traffic. The taking of a traffic census involves stationing a number of traffic census takers for a number of days throughout the year and unless these individuals are equipped with special weighing jacks or other weighing devices they must estimate the probable weight of the vehicle, knowing its capacity and the kind of load carried.

The present device eliminates the necessity for employing traffic census takers and, moreover, insures an accurate determination of the weights of the vehicles operating over the road. The present invention relates to a device for automatically recording the weight of the front and rear axles of the motor vehicles operating on the road.

Figure 1:
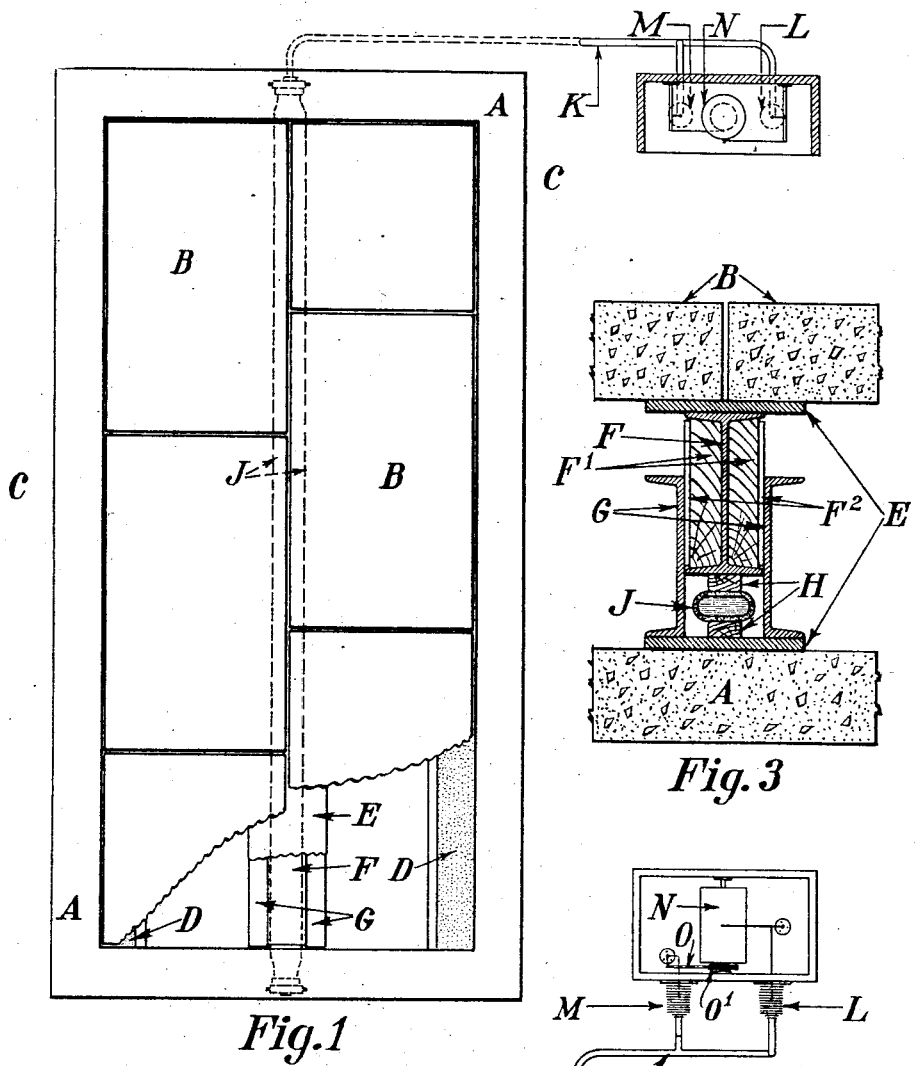
Figure 3:
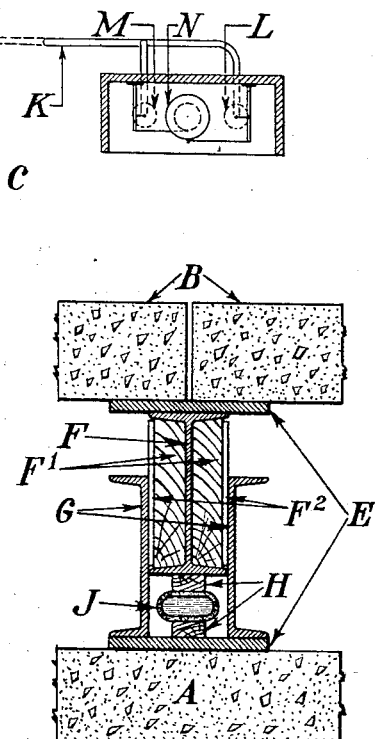
Figure 2:
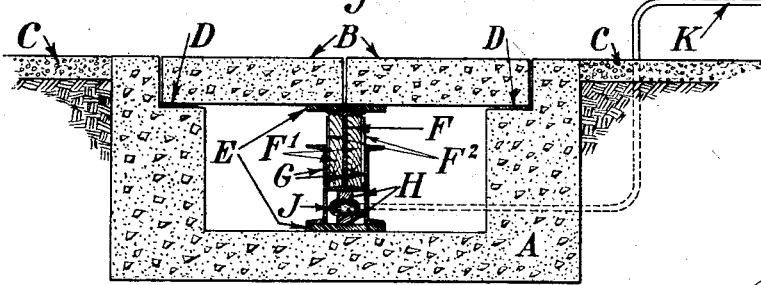

The invention is shown in the accompanying drawing which consists of three figures: Fig. 1 is a plan view of the invention; Fig. 2 shows a cross-section of the same; and Fig. 3 is a sectional view of the weighing portion of the apparatus.

The device is seen to consist essentially of a flexible filled rubber hose, such as fire hose J, resting upon and in turn supporting wood strips H. Upon the upper strip H rests an I-beam F, having wood blocks $F^1$ at each side with steel strips $F^2$ at intervals for guides. The I-beam F is supported laterally by steel channels G, bolted to lower plate E. Upper plate E rests upon the I-beam F and supports the reinforced concrete platform B. From one end of the capped rubber hose J a copper tube K of fine bore is led to a standard pressure recording mechanism consisting essentially of a distensible chamber L, actuating a pencil and to a distensible chamber M, which actuates the recording drum N, of the pressure recording device. The rubber hose J and its container rest at the bottom of a concrete pit A, built across the road.

In operation when a vehicle rolls over the platform B, the pressure in the rubber hose increases as the vehicle advances and becomes a maximum when the wheel is directly over the hose. The vertical motion of the platform B, due to the deformation of the hose is very small. The pressure created in the liquid in the apparatus is transmitted to the distensible chambers M and L, and a vertical line is recorded on the drum, the length of which indicates a definite axle load. The pressure created in distensible chamber M, actuates a pawl O and a ratchet wheel $O^1$ which turns the recording drum N to a new position upon the release of the load, thus placing it in position for recording the next axle load. There is thus created a record consisting of a number of vertical lines of different lengths depending upon the weights of the vehicles that have passed over the counting and weighing device. This record is detached when necessary and its analysis indicates the character of traffic operating on the road. Whenever necessary a second pen is attached to the recording drum and is connected with a time clock for making a record of time. In this way the analysis can be made to include hourly intensity of traffic.

I claim:

In an apparatus for registering the weight and number of vehicles passing a given point on a road, a fluid filled deformable tube placed underneath the road, a rigid structural member supported by said tube, a support for said tube, means for communicating pressure from vehicles passing upon the road to said tube, a pipe leading from said tube and connecting with a recording device, said recording device comprising two distensible chambers, a recording drum, a marker, a device for rotating the drum, one of said distensible chambers adapted to receive pressure from the fluid in said tube and pipe, whereby the marker is actuated and the pressure recorded on said drum, and the other of said distensible chambers adapted to receive pressure from the fluid in said tube and pipe, and drum rotating means controlled thereby.

ALBERT T. GOLDBECK.